(12) United States Patent
Chen

(10) Patent No.: US 8,031,504 B2
(45) Date of Patent: Oct. 4, 2011

(54) MOTHERBOARD AND MEMORY DEVICE THEREOF

(75) Inventor: Yueh-Chih Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 757 days.

(21) Appl. No.: 12/132,602

(22) Filed: Jun. 3, 2008

(65) Prior Publication Data

US 2008/0313394 A1 Dec. 18, 2008

(30) Foreign Application Priority Data

Jun. 5, 2007 (TW) .............................. 96120077 A

(51) Int. Cl.
*G11C 5/02* (2006.01)

(52) U.S. Cl. ......................... 365/51; 365/63; 365/233.13
(58) Field of Classification Search .................... 365/51, 365/63, 233.13
See application file for complete search history.

(56) References Cited

U.S. PATENT DOCUMENTS 6,115,278 A * 9/2000 Deneroff et al. ................. 365/52
* cited by examiner

*Primary Examiner* — Jason Lappas
(74) *Attorney, Agent, or Firm* — Jianq Chyun IP Office

(57) ABSTRACT

A memory device can be directly mounted on a motherboard supporting DDR3 SDRAM, and then the memory device have advantages of the fly-by bus topology and the T branch topology established by the joint electron device engineering council (JEDEC). Thus, the system performance of a desktop computer in a unit interval can be enhanced.

15 Claims, 5 Drawing Sheets

MOTHERBOARD AND MEMORY DEVICE THEREOF

CROSS-REFERENCE TO RELATED APPLICATION

This application claims the priority benefit of Taiwan application serial no. 96120077, filed on Jun. 5, 2007. The entirety of the above-mentioned patent application is hereby incorporated by reference herein and made a part of this specification.

BACKGROUND OF THE INVENTION

1. Field of the Invention

The invention relates to a motherboard of a desktop computer and a memory device thereof and, more particularly, to a motherboard and a memory device which can process work at a higher frequency and enhance the system performance of a desktop computer in a unit interval.

2. Description of the Related Art

Generally speaking, the motherboard of a conventional desktop computer is usually provided with a memory slot for inserting a dual inline memory module (DIMM), which is a standard configuration established by the joint electron device engineering council (JEDEC) and commonly used by the motherboard of the conventional desktop computer.

The JEDEC establishes some reference design configuration for the unbuffered DIMM of the desktop computer. When memory chips on the unbuffered DIMM are double data rate two synchronous dynamic random access memory (DDR2 SDRAM), the JEDEC suggests using the T branch topology. When the memory chips on the unbuffered DIMM are double data rate three synchronous dynamic random access memory (DDR3 SDRAM), the JEDEC suggests using the fly-by bus topology.

FIG. 1 is a schematic diagram showing a conventional DIMM 100 using the T branch topology established by the JEDEC, and a terminator T is connected to a branch point A at the first layer. Theoretically, for the T branch topology established by the JEDEC, branch wires are completely symmetrical, and lengths of wires are balanced by bilateral symmetry. The branch wires are used to connect each of memory chips DDR2 SDRAM0 to DDR2 SDRAM7 on the unbuffered DIMM 100. Therefore, reflection effect of address line signals and command line signals sent out by a memory controller 101 is balanced off by each other to achieve the objective of not damaging the quality of the signals.

The address line signals and the command line signals sent out by the memory controller 101 are not delayed on their transmission path, and therefore, all the memory chips DDR2 SDRAM0 to DDR2 SDRAM7 can receive the address line signals and the command line signals sent out by the memory controller 101 at the same time. Then, the memory controller 101 can do read-write operation on the memory chips DDR2 SDRAM0 to DDR2 SDRAM7 at the same time to enhance the system performance of the desktop computer in a unit interval.

Under an actual condition, when the T branch topology established by the JEDEC is utilized to lay out the wires on a printed circuit board (PCB) for the unbuffered DIMM 100, branches are too much to obtain the completely symmetric branch wires and the wires with the balanced lengths. Then, the reflection effect of the address line signals and the command line signals sent out by the memory controller 101 cannot be balanced off by each other. Thus, the memory chips DDR2 SDRAM0 to DDR2 SDRAM7 receive the address line signals and command line signals which are deformed.

When the operation frequency of the unbuffered DIMM 100 is over a frequency range which is 533 MHz to 800 MHz and is established by the JEDEC, the address line signals and the command line signals sent out by the memory controller 101 may generate a resonant phenomenon. Then, the address line signals and the command line signals received by the memory chips DDR2 SDRAM0 to DDR2 SDRAM7 are seriously attenuated. The above deformed or attenuated signals are not wanted by designers in the computer industry.

FIG. 2 is a schematic diagram showing a conventional unbuffered DIMM 200 using the free-by bus topology established by the JEDEC. Theoretically, the signal transmission mode of the fly-by topology established by the JEDEC is illustrated as follows. A signal is transmitted from the memory chip DDR3 SDRAM0, and then it is transmitted to the memory chips DDR3 SDRAM1 to DDR3 SDRAM7 in series. Finally, a terminator T is connected to the end of the signal transmission path to prevent the address line signals and the command line signals sent out by the memory controller 201 from being reflected. Therefore, since the reflection effect is nearly nonexistent, the address line signals and the command line signals sent out by the memory controller 201 have preferred signal quality, and work at a higher frequency can be processed. The operation frequency established by the JEDEC is 800 MHz to 1600 MHz. Since the fly-by topology established by the JEDEC does not have many branches, the wiring mode of laying out the wires on the PCB is simple.

Under the fly-by bus topology established by the JEDEC, since the address line signals and the command line signals sent out by the memory controller 201 are transmitted from the memory chip DDR3 SDRAM0 to the memory chip DDR3 SDRAM7 in series, the transmitted signals are delayed. The memory chips DDR3 SDRAM0 to DDR3 SDRAM7 begin to work at different time after they receive the address line signals and the command line signals sent out by the memory controller 201, and therefore, the memory controller 201 has to wait for delay time before it does read-write operation on the memory chips DDR3 SDRAM0 to DDR3 SDRAM7. Therefore, the system performance of the desktop computer in a unit interval decreases.

Since the memory controller 201 has to wait for the delay time before it does the read-write operation on the memory chips DDR3 SDRAM0 to DDR3 SDRAM7, the memory controller 201 has to have the capability of independently controlling each of the memory chips DDR3 SDRAM0 to DDR3 SDRAM7 to finish the read-write operation. Therefore, the design of the memory controller 201 is relatively complex.

BRIEF SUMMARY OF THE INVENTION

The objective of the invention is to provide a memory device and a double data rate three synchronous dynamic random access memory (DDR3 SDRAM) device. Via a DDR3 SDRAM which can be operated at a higher frequency, the fly-by bus topology established by the joint electron device engineering council (JEDEC) may be converted to the T branch topology established by the JEDEC, and then advantages of the fly-by bus topology and the T branch topology established by the JEDEC can be obtained at the same time.

Another objective of the invention is to provide a motherboard, and the above memory device or DDR3 SDRAM device of the invention is directly mounted on the motherboard. Then, advantages of the fly-by bus topology and the T branch topology established by the JEDEC can be obtained at the same time.

The memory device provided by the invention includes a plurality of memory chips, a first command or address line, a second command or address line, a third command or address line, a first terminator and a second terminator. The memory chips are divided into two groups. The first command or address line has a first branch point and a plurality of first bifurcation points. The first branch point is located at the center of the first command or address line, each of the first bifurcation points is correspondingly connected to one of the the memory chips of one group, and lengths of first line segments between the first bifurcation points are equal.

The second command or address line has a second branch point and a plurality of second bifurcation points. The second branch point is located at the center of the second command or address line, each of the second bifurcation points is correspondingly connected to one of the memory chips of the another group, and lengths of second line segments between the second bifurcation points equal to the lengths of the first line segments. The third command or address line has a third branch point and two third bifurcation points. The third branch point is located at the center of the third command or address line, and lengths of third line segments between the third bifurcation points and the third branch point are equal. One of the third bifurcation points is connected to the first branch point, and the other third birfurcation point is connected to the second branch point. In addition, the first terminator and the second terminator are connected to the first branch point and the second branch point, respectively.

In one embodiment of the invention, the memory device further includes a memory controller connected to the third branch point to control read-write states of the memory chips via the third branch point.

In one embodiment of the invention, the memory device further includes a plurality of data lines correspondingly connected to the memory chips in a point-to-point mode.

In one embodiment of the invention, the first terminator and the second terminator include a plurality of resistances or resistor arrays, and the memory chips include a double data rate synchronous dynamic random access memory (DDR SDRAM), a double data rate two synchronous dynamic random access memory (DDR2 SDRAM) or a double data rate three synchronous dynamic random access memory (DDR3 SDRAM).

The invention provides a double data rate three synchronous dynamic random access memory (DDR3 SDRAM) device. The DDR3 SDRAM device is the memory device whose memory chips are DDR3 SDRAM chips. The number of the DDR3 SDRAM chips is four or eight. The resistance value of each of the first and second terminators is about 68 to 75 ohm.

The invention provides a motherboard. The memory device or the DDR3 SDRAM device of the invention is directly mounted on the motherboard supporting the DDR3 SDRAM.

The memory device or the DDR3 SDRAM device of the invention is directly mounted on the motherboard of the invention. That is, the motherboard is not provided with memory slots. When the memory chip is a DDR3 SDRAM, the layout mode of the motherboard utilizes the T branch topology established by the JEDEC instead of the fly-by bus topology established by the JEDEC. The number of the terminators is added to two from one, and the terminators have double resistance values and are connected to two second branch points of the T branch topology, respectively.

Therefore, the motherboard provided by the invention has the advantage of the fly-by bus topology. That is, work at a higher frequency can be processed, and the wiring mode for laying out the wires on the motherboard is simple. The motherboard provided by the invention also has the advantage of the T branch topology. That is, read-write operation can be done at all the memory chips at the same time, and then the system performance of a desktop computer is enhanced in a unit interval.

These and other features, aspects, and advantages of the present invention will become better understood with regard to the following description, appended claims, and accompanying drawings.

DETAILED DESCRIPTION OF THE EMBODIMENTS

Figure 1:
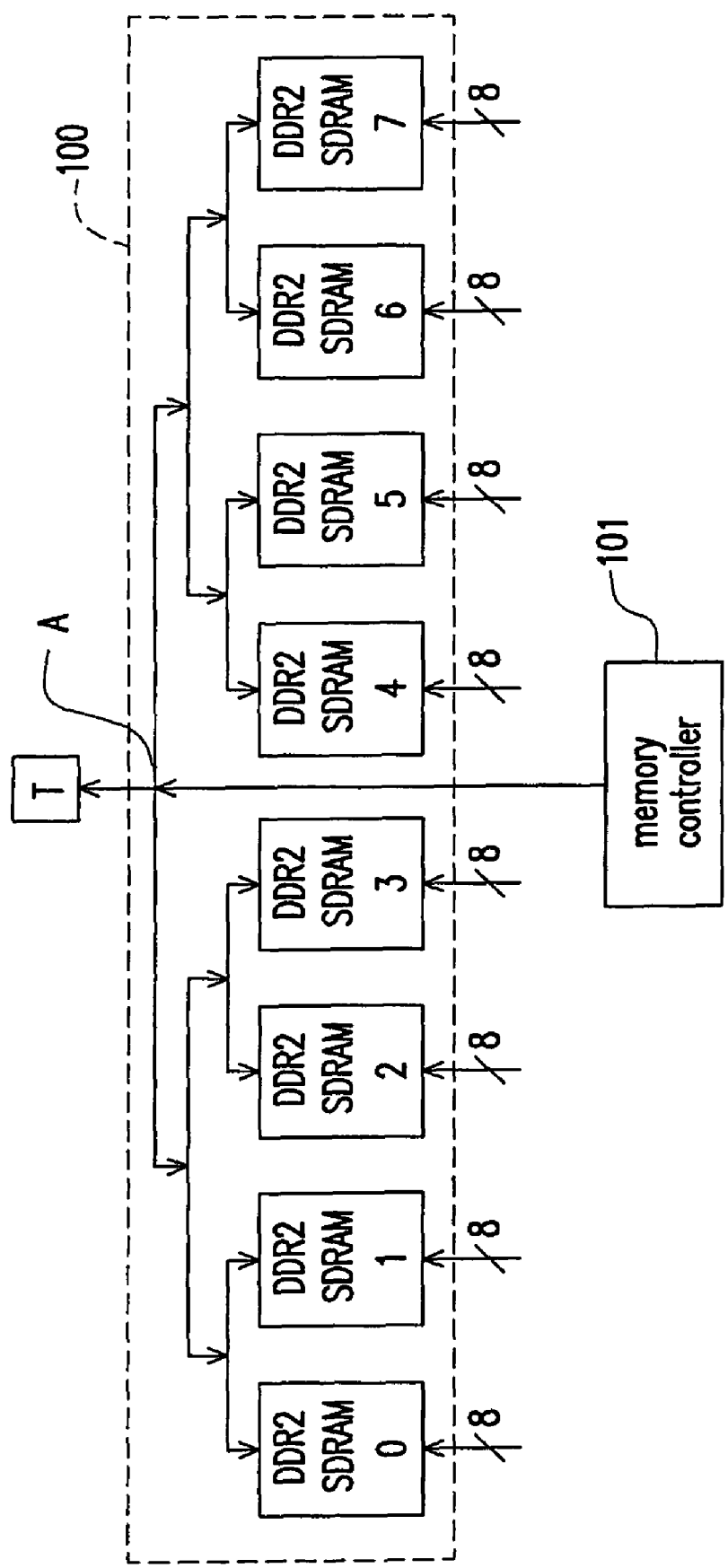
FIG. 1 is a schematic diagram showing a conventional unbuffered dual inline memory module (DIMM) using a T branch topology established by the joint electron device engineering council (JEDEC).
Figure 2:
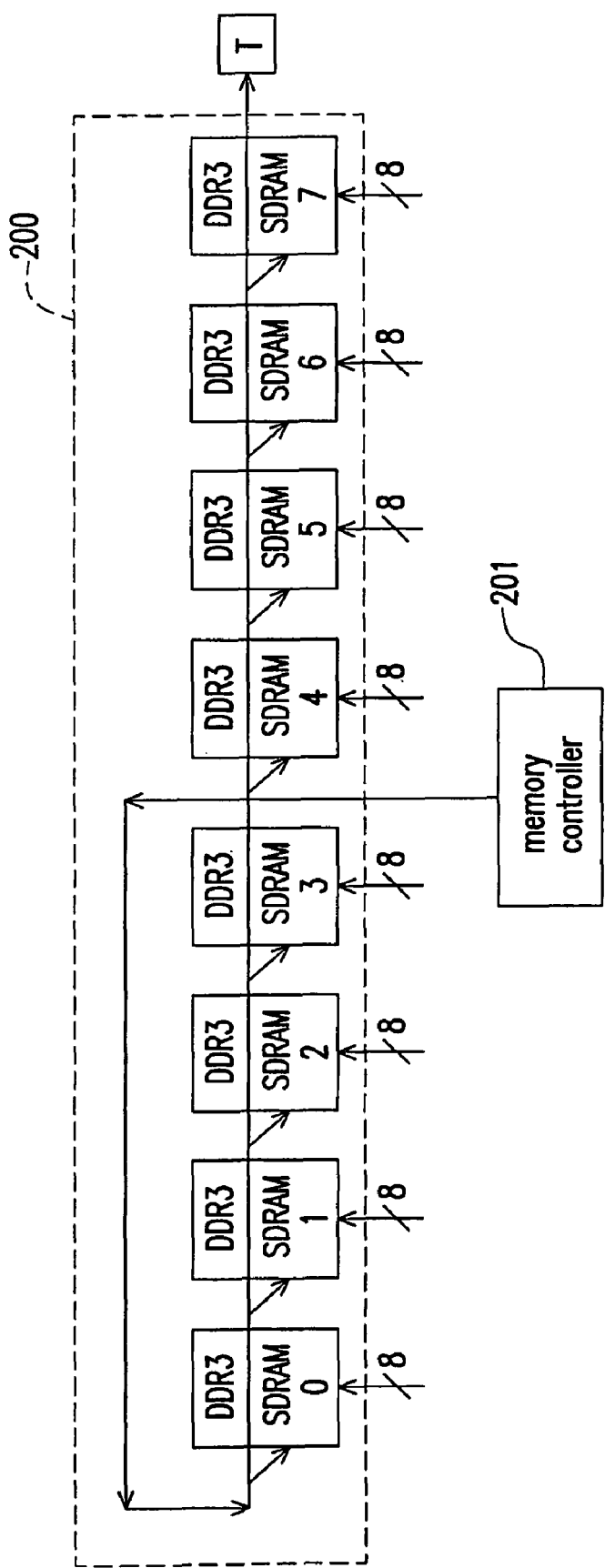
FIG. 2 is a schematic diagram showing a conventional unbuffered dual inline memory module (DIMM) using a free-by bus topology established by the joint electron device engineering council (JEDEC).
Figure 3:
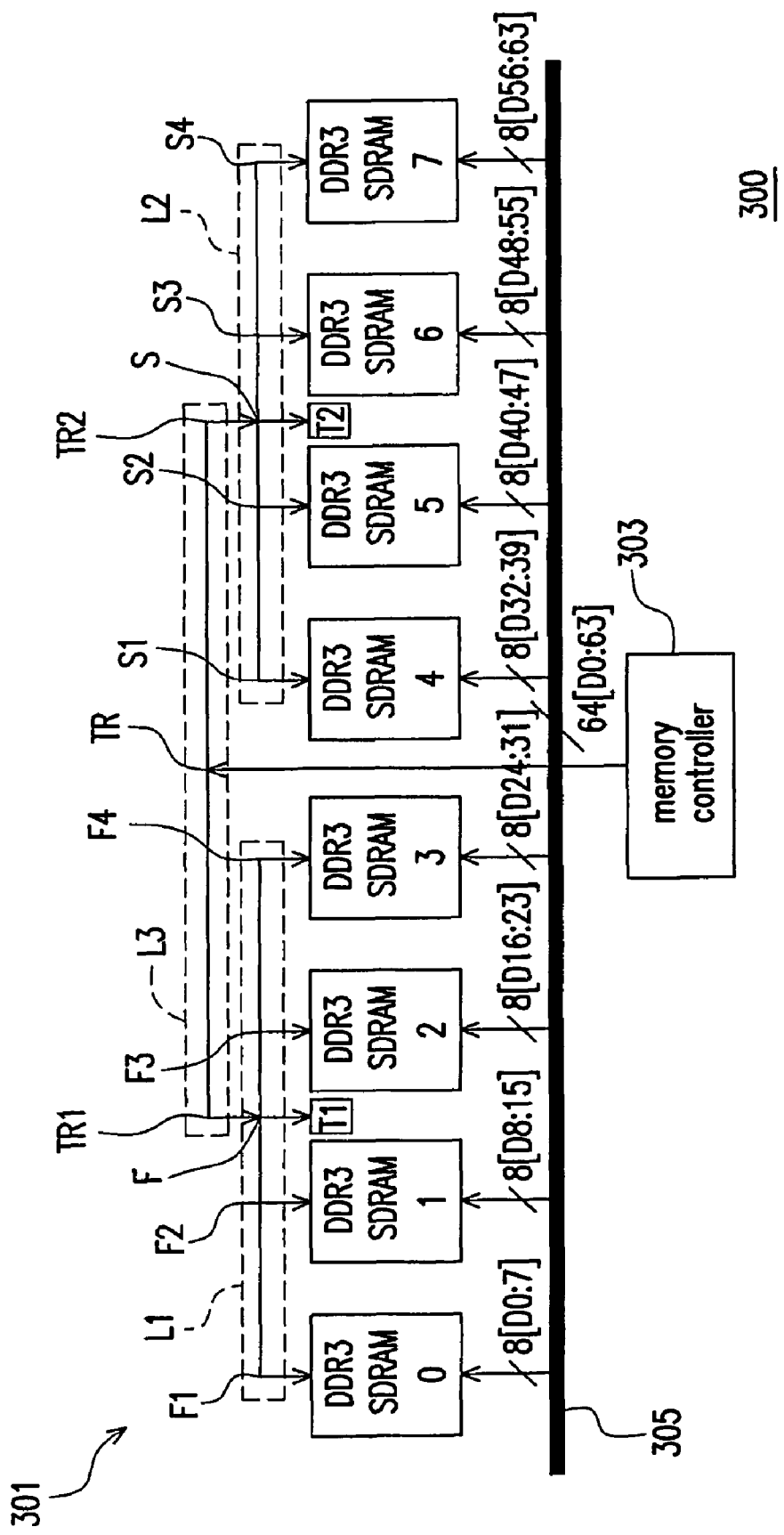
FIG. 3 is a schematic diagram showing a motherboard of one embodiment of the invention.

FIG. 3 is a schematic diagram showing a motherboard 300 of one embodiment of the invention. The motherboard 300 has a memory device 301 directly mounted on the motherboard 300. In the embodiment, the memory device 301 includes a plurality of memory chips such as eight double data rate three synchronous dynamic random access memory (DDR3 SDRAM) chips DDR3 SDRAM0 to DDR3 SDRAM7, a first command or address line L1, a second command or address line L2, a third command or address line L3, a first terminator T1, a second terminator T2, a memory controller 303 and a data bus 305 consisting of sixty-four data lines [D0: 63]. The memory chips DDR3 SDRAM0 to DDR3 SDRAM7 are divided into a first group including the memory chips DDR3 SDRAM0 to DDR3 SDRAM3 and a second group including the memory chips DDR3 SDRAM4 to DDR3 SDRAM7.

The first command or address line L1 has one first branch point F and four first bifurcation points F1 to F4. The first branch point F is located at the center of the first command or address line L1, and each of the first bifurcation points F1 to F4 is correspondingly connected to one of the memory chips DDR3 SDRAM0 to DDR3 SDRAM3 of the first group. Lengths of first line segments between the first bifurcation points F1 to F4 are equal.

The second command or address line L2 has one second branch point S and four second bifurcation points S1 to S4. The second branch point S is located at the center of the second command or address line L2, each of the second bifurcation points S1 to S4 is correspondingly connected to one of the the memory chips DDR3 SDRAM4 to DDR3

SDRAM7 of the second group, and lengths of second line segments between the second bifurcation points S1 to S4 equal to the lengths of the first line segments.

The third command or address line L3 has one third branch point TR and two third bifurcation points TR1 and TR2. The third branch point TR is located at the center of the third command or address line L3, and lengths of third line segments between the third bifurcation point TR1 and the third branch point TR and between the third bifurcation point TR2 and the third branch point TR are equal. The third bifurcation point TR1 is connected to the first branch point F, and the other third birfurcation point TR2 is connected to the second branch point S.

The first terminator T1 and the second terminator T2 consist of a plurality of resistances or resistor arrays (not shown), and they are connected to the first branch point F and the second branch point S, respectively. The memory controller 303 is connected to the third branch point TR to control read-write states of the memory chips DDR3 SDRAM0 to DDR3 SDRAM7 via the third branch point TR. The data lines [D0: 63] are correspondingly connected to the memory chips DDR3 SDRAM0 to DDR3 SDRAM7 in a point-to-point mode.

The memory device 301 of the embodiment utilizes two terminators T1 and T2. The two terminators T1 and T2 are respectively connected to the branch points F and S of the second layer of the whole T branch topology, and resistance values of the two terminators T1 and T2 are about 68 to 75 ohm, respectively. According to the configuration of the memory device 301 in FIG. 3, the reflection effect of address line signals and command line signals sent out by the memory controller 303 can be balanced off by each other to achieve the objective of not damaging the quality of the signals. The memory chips DDR3 SDRAM0 to DDR3 SDRAM7 can receive the address line signals and the command line signals sent out by the memory controller 303 at the same time to enable the memory controller 303 to do read-write operation on the memory chips DDR3 SDRAM0 to DDR3 SDRAM7 at the same time, and then, the system performance of a desktop computer using the motherboard 300 of the embodiment in a unit interval is enhanced.

In another embodiment of the invention, the memory device 301 is directly mounted on the motherboard 300. Therefore, a conventional memory slot is omitted, the total route length of laying out wires decreases, and the signal quality of the memory chips DDR3 SDRAM0 to DDR3 SDRAM7 working at a higher frequency is enhanced. In this way, the highest operation frequency of the memory chips DDR3 SDRAM0 to DDR3 SDRAM7 can be higher than the highest operation frequency established by the JEDEC, and therefore, the system performance of a desktop computer using the motherboard 300 of the embodiment in a unit interval is enhanced.

Since the memory chips DDR3 SDRAM0 to DDR3 SDRAM7 of the embodiment are DDR3 SDRAMs, their operation frequency is about 800 MHz to 1600 MHz. Therefore, when the memory device 301 of the embodiment utilizes the T branch topology cooperated with the configuration having the two terminators mentioned above, the memory device 301 can also process work at a higher frequency, and signal reflection and resonance phenomena do not easily occur. At that moment, the memory controller 303 does not need to wait for delay time, and it can do read-write operation on the memory chips DDR3 SDRAM0 to DDR3 SDRAM7 at the same time. Therefore, the memory controller 303 of the embodiment can be easily designed.

The memory chips of the embodiment are not limited to be the DDR3 SDRAMs. That is, based on the spirit of the invention, a user can use the DDR2 SDRAM or the DDR SDRAM as the memory chips according to actual design requirements. Persons having ordinary skill in the art can carry out an embodiment in which the memory device 301 has four DDR3 DRAM chips on the analogy of the content mentioned above.

From the above, the memory device 301 of the embodiment not only does not use the fly-by bus topology established by the JEDEC but also further improves the T branch topology established by the JEDEC. Thus, the DDR3 SDRAM can further rapidly and steadily work.

Figure 4A:
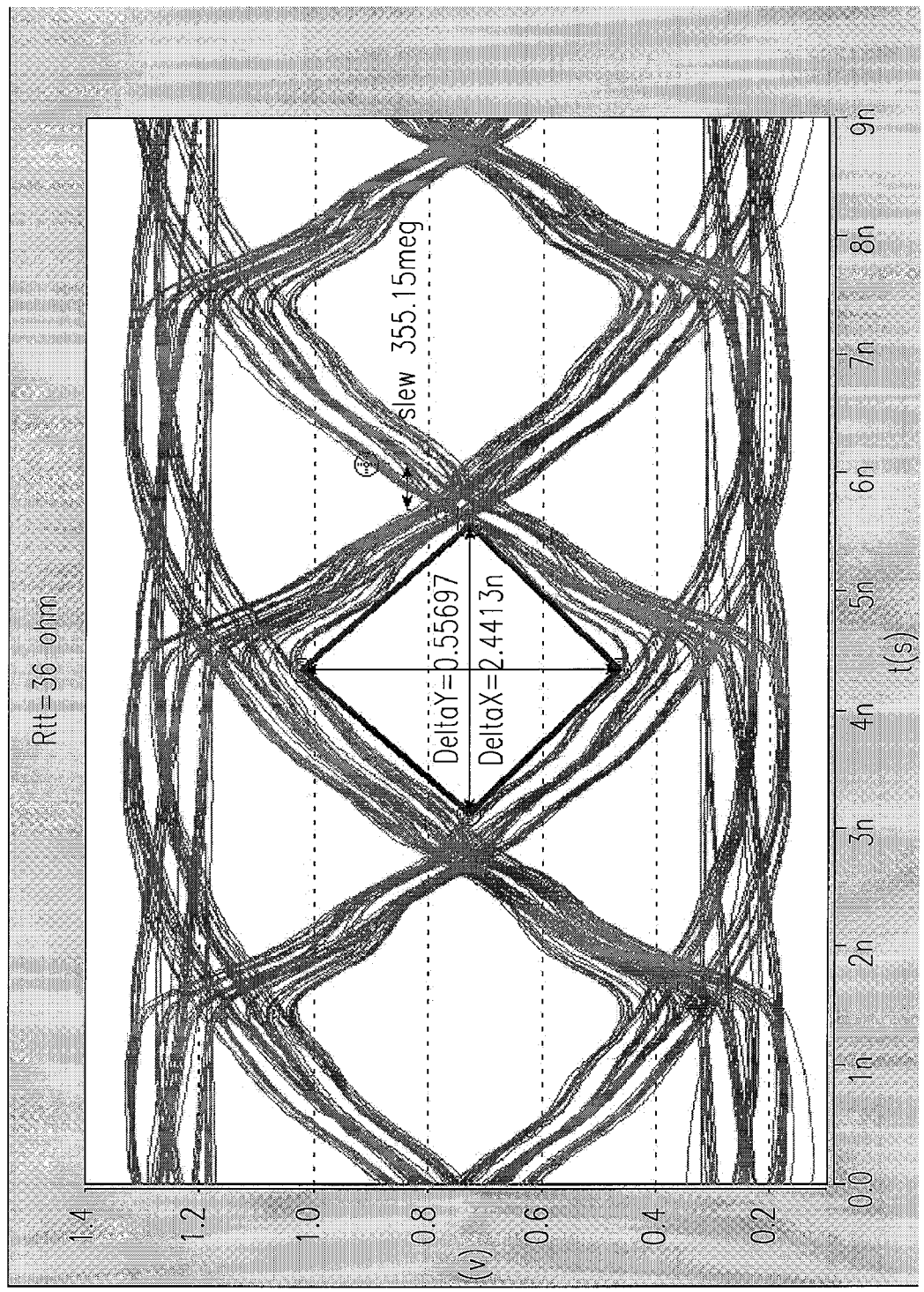
FIG. 4A is a simulation signal eye diagram of the memory device in FIG. 3 when a single terminator is connected to a third branch point.
Figure 4B:
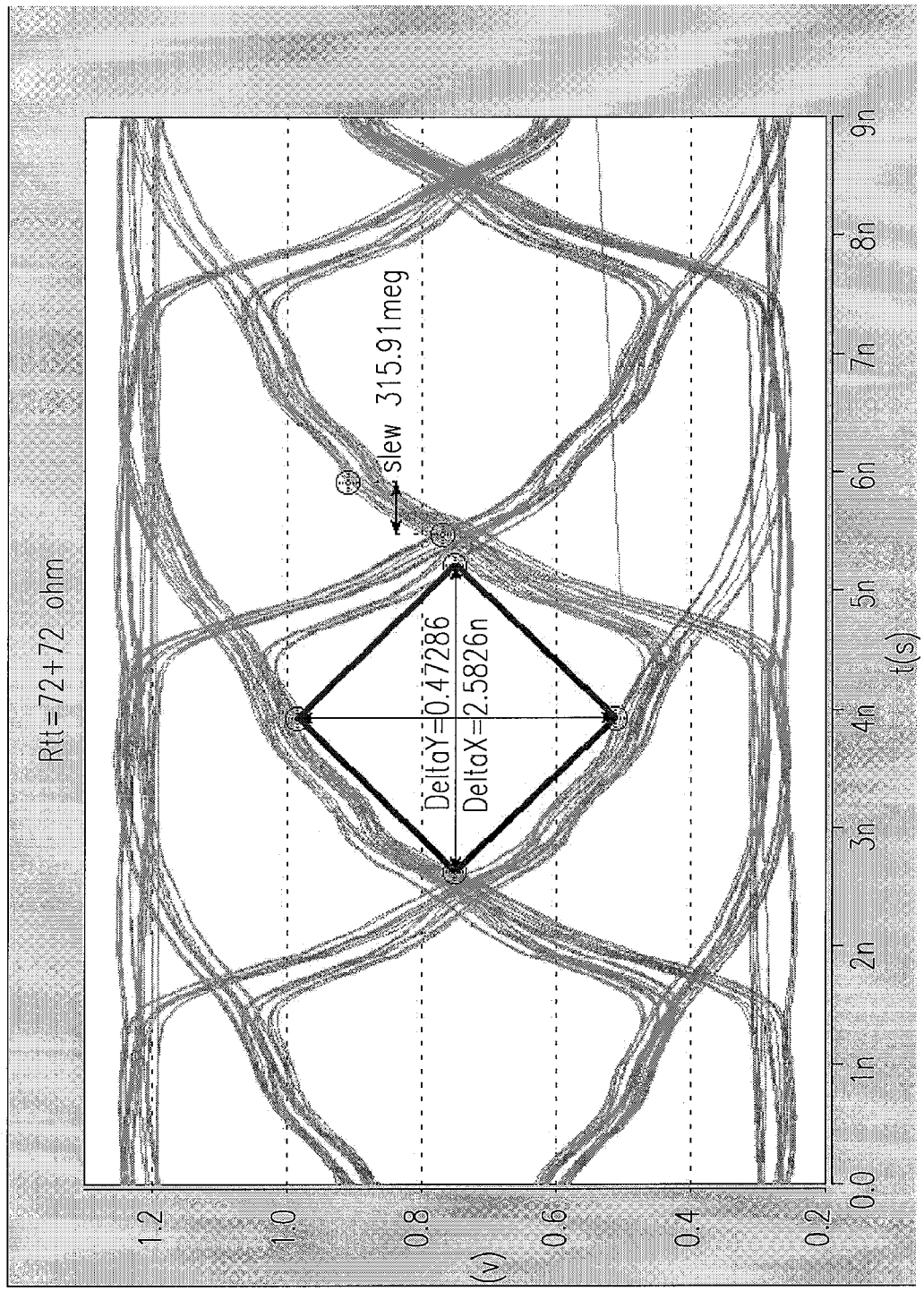
FIG. 4B is a simulation signal eye diagram of the memory device in FIG. 3 when two terminators are connected to a first branch point and a second branch point, respectively.

FIG. 4A is a simulation signal eye diagram of the memory device 301 in the above embodiment when the single terminator T is connected to the third branch point TR. FIG. 4B is a simulation signal eye diagram of the memory device 301 in the above embodiment when the terminators T1 and T2 are connected to the first branch point F and the second branch point S, respectively. As shown in FIG. 4A and FIG. 4B, time intervals of rhombic areas in the eye diagrams are 2.4413 nanosecond and 2.5826 nanosecond, respectively, and the signal intensity of the rhombic areas in the eye diagrams is 0.55697 voltage and 0.47286 voltage, respectively. Therefore, when the intensity can be identified, persons having ordinary skill in the art should know that the signal in the eye diagram in FIG. 4B is steadier than the signal in the eye diagram in FIG. 4A.

To sum up, the memory device provided by the invention can be directly mounted on the motherboard supporting the DDR3 SDRAM, and it integrates the advantages of the fly-by bus topology and the T branch topology established by the JEDEC to enhance the system performance of the desktop computer in a unit interval.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A memory device comprising:
a plurality of memory chips divided into the memory chips of a first group and the memory chips of a second group;
a first command or address line having a first branch point and a plurality of first bifurcation points, wherein the first branch point is located at the center of the first command or address line, each of the first bifurcation points is correspondingly connected to one of the memory chips of the first group, and the length of a plurality of first line segments between the first bifurcation points are equal;
a second command or address line having a second branch point and a plurality of second bifurcation points, wherein the second branch point is located at the center of the second command or address line, each of the second bifurcation points is correspondingly connected to one of the memory chips of the second group, and the length of a plurality of second line segments between the second bifurcation points equal to the length of the first line segment;
a third command or address line having a third branch point and two third bifurcation points, wherein the third branch point is located at the center of the third command or address line, the length of a plurality of third line segments between each of the third bifurcation points and the third branch point are equal, one of the third bifurcation points is connected to the first branch point, and the other third birfurcation point is connected to the second branch point;

a first terminator connected to the first branch point; and a second terminator connected to the second branch point.

2. The memory device according to claim 1 further comprising a memory controller connected to the third branch point to control read-write states of the memory chips via the third branch point.

3. The memory device according to claim 1 further comprising a plurality of data lines correspondingly connected to the memory chips in a point-to-point mode.

4. The memory device according to claim 1, wherein the first terminator and the second terminator comprise a plurality of resistances or resistor arrays.

5. The memory device according to claim 1, wherein the memory chips comprise a double data rate synchronous dynamic random access memory (DDR SDRAM), a double data rate two synchronous dynamic random access memory (DDR2 SDRAM) or a double data rate three synchronous dynamic random access memory (DDR3 SDRAM).

6. A motherboard comprising:

a memory device directly mounted on the motherboard, the memory device comprising:

a plurality of memory chips divided into the memory chips of a first group and the memory chips of a second group;

a first command or address line having a first branch point and a plurality of first bifurcation points, wherein the first branch point is located at the center of the first command or address line, each of the first bifurcation points is correspondingly connected to one of the memory chips of the first group, and the length of a plurality of first line segments between the first bifurcation points are equal;

a second command or address line having a second branch point and a plurality of second bifurcation points, wherein the second branch point is located at the center of the second command or address line, each of the second bifurcation points is correspondingly connected to one of the memory chips of the second group, and the length of a plurality of second line segments between the second bifurcation points equal to the length of the first line segment;

a third command or address line having a third branch point and two third bifurcation points, wherein the third branch point is located at the center of the third command or address line, the length of a plurality of third line segments between each of the third bifurcation points and the third branch point are equal, one of the third bifurcation points is connected to the first branch point, and the other third birfurcation point is connected to the second branch point;

a first terminator connected to the first branch point; and a second terminator connected to the second branch point.

7. The motherboard according to claim 6, wherein the memory device further comprises a memory controller connected to the third branch point to control read-write states of the memory chips via the third branch point.

8. The motherboard according to claim 6, wherein the memory device further comprises a plurality of data lines correspondingly connected to the memory chips in a point-to-point mode.

9. The motherboard according to claim 6, wherein the first terminator and the second terminator comprise a plurality of resistances or resistor arrays.

10. The motherboard according to claim 6, wherein the memory chips comprise a double data rate synchronous dynamic random access memory (DDR SDRAM), a double data rate two synchronous dynamic random access memory (DDR2 SDRAM) or a double data rate three synchronous dynamic random access memory (DDR3 SDRAM).

11. A double data rate three synchronous dynamic random access memory (DDR3 SDRAM) device comprising:

a plurality of DDR3 SDRAM chips which are divided into the DDR3 SDRAM chips of a first group and the DDR3 SDRAM chips of a second group;

a first command or address line having a first branch point and a plurality of first bifurcation points, wherein the first branch point is located at the center of the first command or address line, each of the first bifurcation points is correspondingly connected to one of the DDR3 SDRAM chips of the first group, and the length of a plurality of first line segments between the first bifurcation points are equal;

a second command or address line having a second branch point and a plurality of second bifurcation points, wherein the second branch point is located at the center of the second command or address line, each of the second bifurcation points is correspondingly connected to one of the DDR3 SDRAM chips of the second group, and the length of a plurality of second line segments between the second bifurcation points equal to the length of the first line segment;

a third command or address line having a third branch point and two third bifurcation points, wherein the third branch point is located at the center of the third command or address line, the length of a plurality of third line segments between each of the third bifurcation points and the third branch point are equal, one of the third bifurcation points is connected to the first branch point, and the other third birfurcation point is connected to the second branch point;

a first terminator connected to the first branch point; and a second terminator connected to the second branch point.

12. The DDR3 SDRAM device according to claim 11 further comprising a memory controller connected to the third branch point to control read-write states of the DDR3 SDRAM chips via the third branch point.

13. The DDR3 SDRAM device according to claim 11 further comprising a plurality of data lines correspondingly connected to the DDR3 SDRAM chips in a point-to-point mode.

14. The DDR3 SDRAM device according to claim 11, wherein the first terminator and the second terminator comprise a plurality of resistances or resistor arrays, and the resistance value of each of the resistances or resistor arrays is about 68 to 75 ohm.

15. The DDR3 SDRAM device according to claim 11, wherein the number of the DDR3 SDRAM chips is four or eight.

* * * * *